United States Patent

[11] 3,571,792

| | | |
|---|---|---|
| [72] | Inventor | Francis Sullivan<br>Canoga Park, Calif. |
| [21] | Appl. No. | 781,467 |
| [22] | Filed | Dec. 5, 1968 |
| [45] | Patented | Mar. 23, 1971 |
| [73] | Assignees | Walter G. Mortensen;<br>Donald R Mauran; Francis Sullivan; James B. Davidson, Sherman Oaks, Calif. |

[54] BICYCLE STOPLIGHT CONTROLLED BY SPROCKET WHEEL
7 Claims, 9 Drawing Figs.

[52] U.S. Cl.................................................. 340/134,
340/69, 340/87, 200/61.12
[51] Int. Cl................................................. G08b 5/36
[50] Field of Search........................................ 340/87, 69,
134; 200/61.12

[56] References Cited
UNITED STATES PATENTS

| 2,236,455 | 3/1941 | Stetz............................ | 200/61.12 |
| 2,497,012 | 2/1950 | Pearl............................ | 200/61.12 |

*Primary Examiner*—Harold I. Pitts
*Attorney*—Beehler & Arant

ABSTRACT: A bicycle stoplight that includes a small wheel having a frictional surface and positioned generally perpendicular to the bicycle sprocket wheel and disposed in frictional engagement with one side surface of the sprocket wheel, and switch means associated with the wheel which operates to keep the lamp circuit open when the sprocket is rotating in a forward direction but to close the lamp circuit when the sprocket rotates in a reverse direction.

PATENTED MAR 23 1971
3,571,792
SHEET 1 OF 2
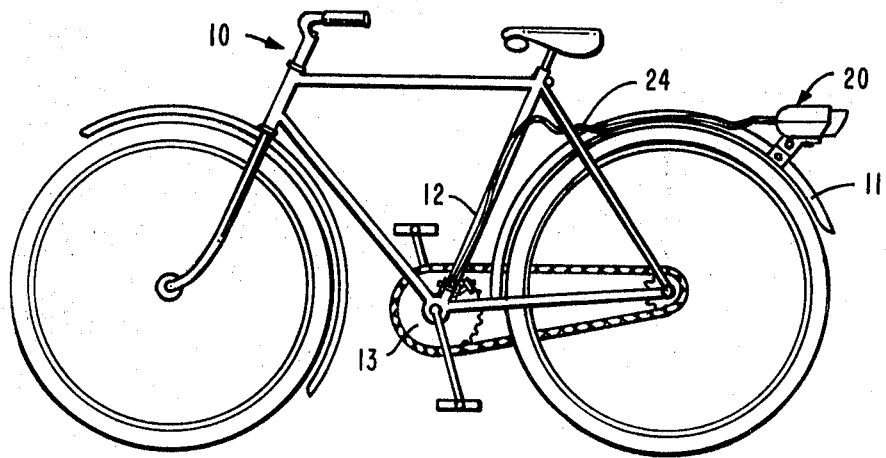
FIG.-1
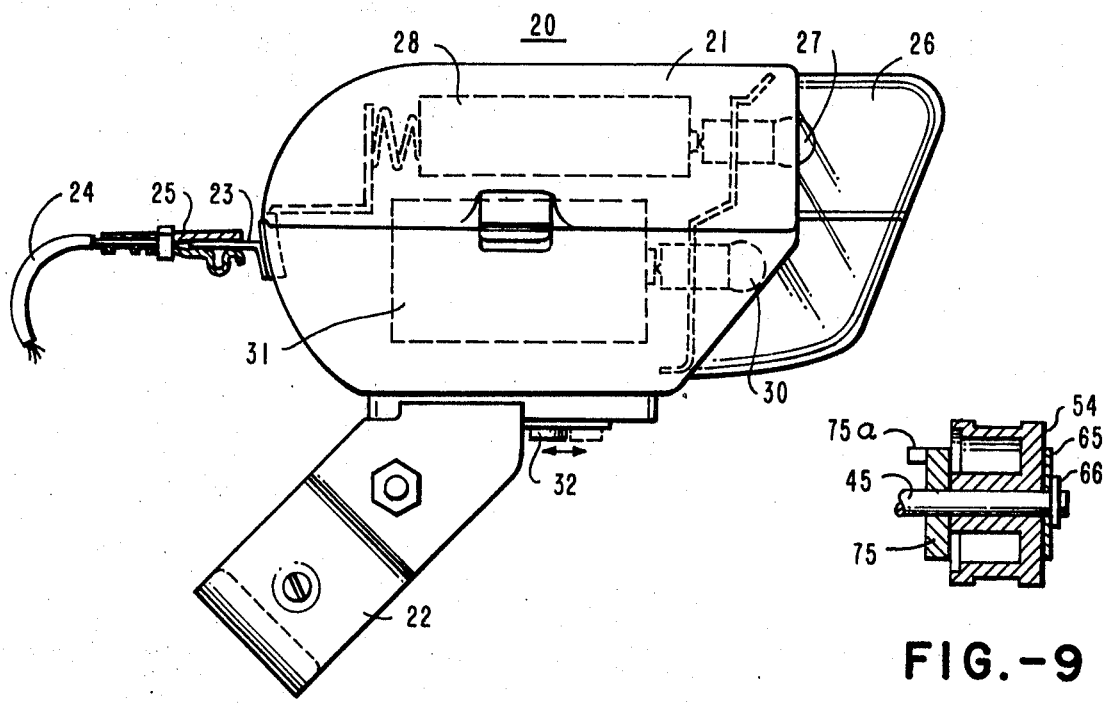
FIG.-2
FIG.-9
INVENTOR
FRANCIS SULLIVAN
BY
*Beehler & Arant*
ATTORNEYS

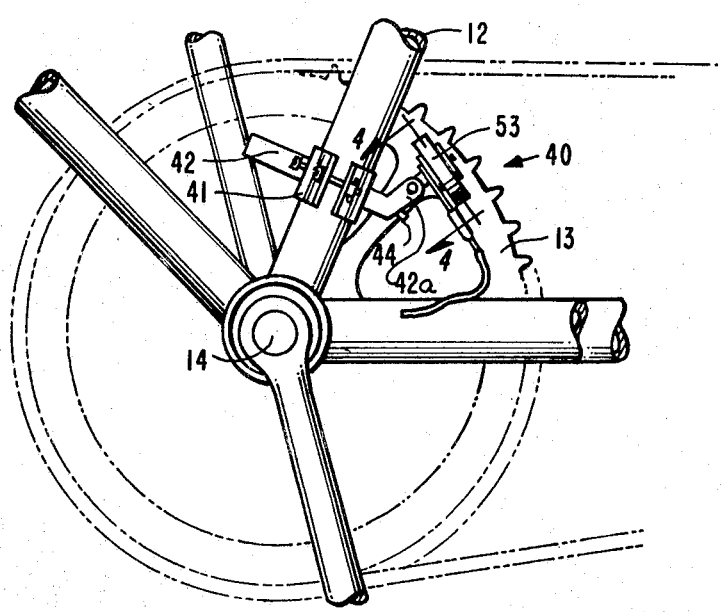
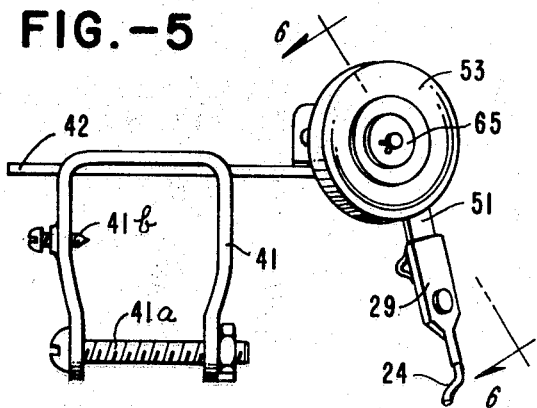
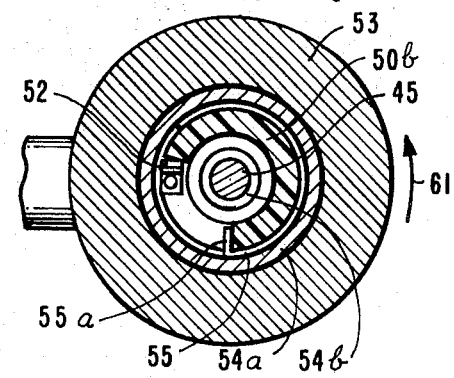
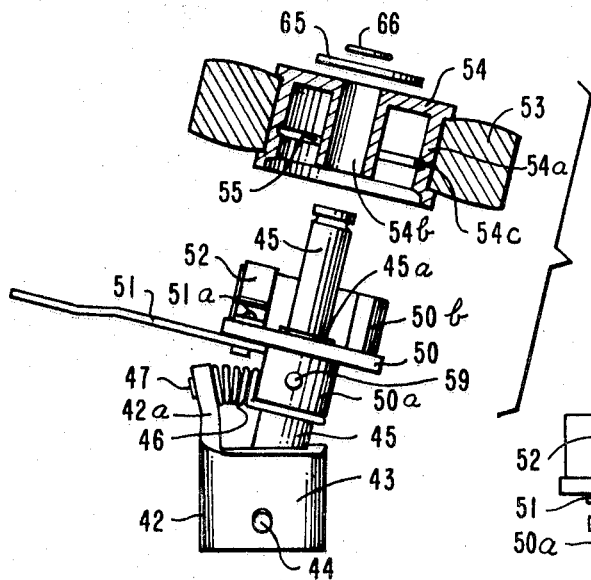

BICYCLE STOPLIGHT CONTROLLED BY SPROCKET WHEEL

BACKGROUND OF THE INVENTION

The present invention is an improvement over that disclosed in U.S. Pat. No. 2,507,420 issued May 9, 1950.

The object and purpose of the present invention is to provide an improved bicycle stop light, which can be economically manufactured, easily attached to the bicycle, and is reliably actuated by a reverse rotating movement of the bicycle sprocket for turning on the stoplight.

DRAWINGS SUMMARY

FIG. 1 is a side elevation view of a bicycle to which the invention has been attached;

FIG. 2 is an enlarged side view of the lamp housing;

FIG. 3 is an enlarged fragmentary view of the sprocket wheel, associated frame portions, and switch device attached thereto;

FIG. 4 is a cross-sectional view taken on the line 4—4 of FIG. 3;

FIG. 5 is a top plan view of the switch device of FIG. 3;

FIG. 6 is a cross-sectional view taken on the line 6—6 of FIG. 5;

FIG. 7 is a view like FIG. 4 with the wheel rotation reversed; and

FIG. 8 is a detailed view of one of the interior parts.

PREFERRED EMBODIMENT

Referring now to the drawings, a bicycle 10 has a rear fender 11 to which a light 20 is attached. A cord 24 extends forward from the light 20 along the upper surface of the fender 11, and hence to the vertical frame member 12, and down the frame member to the vicinity of sprocket 13. At the lower end of frame member 12 a switch 40 is attached, which operates in conjunction with the rotation of the sprocket wheel for either opening or closing the lamp circuit.

More specifically, while the cord 24 could be of the two-conductor variety, it is preferred to utilize a single conductor and have the ground or return path for the lamp current flow through the body or frame of the bicycle. It is also preferred that the light 20 have two separate portions, one of which may be manually controlled for turning on whenever darkness occurs, and the other being controlled by the switch 40 for indicating a braking or stopping action of the bicycle. Thus as shown in FIG. 2 the light 20 includes a housing 21 having a red plastic diffuser 26 attached to its rearward end. Housing 21 is attached to rear fender 11 by means of a bracket 22. An upper lamp 27 is disposed in the upper portion of diffuser 26, and a lower lamp 30 is disposed in its lower portion. Lower lamp 30 is selectively energized from a battery 31 that is disposed in the lower part of housing 21, and on the bottom of the housing a manual switch 32 is used for turning the lamp 30 on or off. The specific details of the circuit for lamp 30, and of the construction and operation of manual switch 32, are conventional and therefore need not be shown. Upper lamp 27 has one of its terminals connected to the frame of the vehicle through the interior frame of housing 21, while its other terminal is connected to upper battery 28, disposed in the upper portion of housing 21. The other end of battery 28 is electrically connected to an exterior terminal 23, to which a connector 25 is selectively attached for making a continuous circuit with the cord 24. Thus, whenever the remote end of cord 24 (not shown in FIG.) is connected to the vehicle frame, current will then flow from battery 28 through the upper lamp 27.

Thus the function and purpose of the switch 40 is to remain open whenever the bicycle is being pedaled in a forward direction, so that the upper lamp 27 will not be energized. But whenever the sprocket wheel 13 is turned in a reverse direction, switch 40 is intended to connect its associated end of cord 24 to the bicycle frame, to thereby complete the circuit through the lamp 27, and warn persons following to the rear of the bicycle that the bicycle is in process of slowing down or stopping.

Referring specifically to FIGS. 3 to 8, inclusive, of the drawings, the structure and operation of the stop switch 40 will now be described. A U-shaped bracket 41 is extended around the inner side of the vertical frame member 12, next to sprocket wheel 13, so that the legs of bracket 41 extend outwardly from the frame member 12. A bolt 41a passes through holes on the outer ends of the bracket legs for tightening the bracket in place. On one leg (the forward leg) of bracket 41 there is also provided a threaded setscrew 41b having a sharp point, and the purpose of this setscrew is to precisely locate the bracket 41 in place and permit it to be locked against either vertical sliding movement or rotating movement. Near the bottom of bracket 41 the legs are pierced with openings which receive an elongated slide member 42; and although the slide member 42 is otherwise free to slide back and forth relative to bracket 41, the positioning of bracket 41 on the frame member 12 and its subsequent tightening serves to frictionally engage the slide member 42 both with the bracket 41 and with the frame member 12. The rubber wheel 53 is supported from the rearward (and somewhat lowermost) end of slide member 42, and it may be desired to adjust the longitudinal position of slide member 42 in order to insure the proper engagement of the rubber wheel 53 with the available portion of sprocket wheel 13 (see FIG. 3).

As best seen in FIG. 3 the frame member 12, although extending in a generally vertical direction, is also inclined to the rear by about 25°. Slide member 42 therefore has its forward end angled relative to its rearward end by about 25°. The rearward end of slide member 42, however, has an ear or flange 42a which extends in an upward direction, this ear or flange lying at an angle of about 70° relative to what would otherwise be the downward extension of slide member 42, and therefore extending at an angle of about 45° relative to the horizontal or 45° relative to the vertical. The rearward end of slide member 42 is also folded over at 43 (see FIG. 6), being bent through an angle of 90° three times so as to form a complete enclosure. The end of wheel shaft 45 extends into that enclosure, and a pin 44 carried by the walls of housing 43 extends through an opening in the end of shaft 45, so that rubber wheel 53 may be pivoted either toward or away from the flat surface of sprocket wheel 13 that it is supposed to frictionally engage. As best seen in FIG. 3 the wheel shaft 45 if extended would intersect the bicycle sprocket 14, and the pin 44 permits shaft 45 to pivot back and forth in the plane of the ear or flange 42a, i.e., in a plane which lies about 45° behind the vertical and about 45° above the horizontal.

An insulator 50 is attached to the shaft 45 intermediate pin 44 and the rubber wheel 53. Insulator 50 is preferably made of rigid plastic, and includes a central circular portion which abuts against an enlarged portion 45a of the shaft 45. Insulator 50 has a small cylindrical lower end (see FIG. 6) which is rigidly pinned by a pin 59 to the shaft 45. A small compression spring 46 has one end secured around shaft 45, adjacent the insulator end 50a while its other end is retained on the ear or flange 42a by a pin 47. Thus the rubber wheel 53 is at all times urged, by the action of spring 46, into frictional engagement with the sprocket wheel 13.

Insulator 50 also includes a cylindrical outer end 50b, whose inner diameter is a great deal larger than that of the shaft 45 or its enlargement 45a. However, the cylinder 50b is cut away throughout about 90° of its circumference (see FIGS. 4 and 7). An outside terminal 51 (FIG. 6) has its inner end attached to the central flat ring portion of insulator 50, while an inside terminal 52 is located on the inside of this ring, in the area where cylinder 50b is cut away. A metal pin 51a passes through the central ring of insulator 50 and both mechanically and conductively fastens the terminals 51 and 52 together. A connector 29 (FIG. 5) fastens the remote end of cord 24 to the outside terminal 51.

The inside terminal 52 has an L-shaped configuration, as best seen in FIG. 8. This is significant for the opening and closing action of the switch as a result of rotation of rubber wheel 53. As best seen in FIG. 6 the rubber wheel 53 is mounted on a metal hub 54. The hub 54 consists of a cylinder open at its lower end and closed at its upper end, with an inner cylinder attached to the closed upper end of the large or main cylinder portion. The inner cylinder 54b, while freely rotatable on the end of shaft 45, nevertheless maintains a good electrically conductive contact therewith. The outer cylinder of the metal hub 54 has a circumferential groove 54c formed therein. Groove 54c is occupied by a curved wire 55, which is bent to the curvature of the groove so as to permanently seat therein. However, the wire 55 is of such length that it extends around the hub only somewhat more than 180°. One end 55a of the wire 55 is bent inwardly, at an angle of 90° toward the inner cylinder 54b of the hub.

The operation of the stoplight switch is as follows. When sprocket wheel 13 is rotating forward the rubber wheel 53 then rotates in its forward (counterclockwise) direction as shown by arrows 61 in FIG. 4. The end 55a of wire 55 then rides against the cut away end of insulating portion 50b that does not carry the terminal 52. The electrical circuit is incomplete and the upper or warning light 27 is not turned on.

But when the sprocket wheel 13 is reversed, the rubber wheel 53 then rotates in its reverse (clockwise) direction as shown by arrow 62 of FIG. 7. Wire end 55a then engages inside terminal 52. A complete circuit is made through cord 24, connector 29, outside terminal 51, pin 51a, inner terminal 52, wire end 55a, wire 55, groove 54c, outer hub 54a, the closed outer end of hub 54, hub inner portion 54b, shaft 45, pin 44, slide member 42, bracket 41, setscrew 41b, and frame member 12. The upper lamp 27 therefore lights indicating that the bicycle is either slowing or stopping. Reversal of the wheel causes finger 55a to be detained by contact 52, which bends finger 55a inward, causing friction between wire 55 and hub 54a to increase, thus increasing the pressure of finger 55a against contact 52 and ensuring good electrical conductivity. Engagement of finger 55a with stop 50b has the opposite effect.

It will be understood that insulator 50 is rigidly affixed to shaft 45 by means of the pin 59, hence engagement of the wire end 55a with contact 52 does not cause the insulator 50 to rotate on the shaft. However, wire 55 is free to slide circumferentially around inside the groove 54c. This is what happens. Likewise, when wheel 53 rotates in the forward direction, and wire end 53a is in engagement with the stop formed by insulator portion 50b, then again the wire 55 slides inside the groove 54c.

In the assembled condition, cylinder 50b of insulating member 50 projects into the hollow interior of hub 54, between the outer cylinder 54a and inner cylinder 54b. Hub 54 is held on shaft 45 by means of a washer 65 and a cotter pin 66.

ALTERNATE FORMS

In lieu of wire 55 it may be desired to utilize a sleeve 75 having a finger 75a, the sleeve 75 being rotatable on shaft 45 and driven by friction from hub 54. See FIG. 9.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

I claim:

1. In a bicycle brake light, a brake light switch comprising:
 a metal shaft positioned generally parallel to a radius of the sprocket;
 a bracket fastened to the bicycle frame, including means pivotally supporting the inner end of said shaft so that the outer end thereof may swing toward or away from the sprocket;
 spring means urging the outer end of said shaft toward the sprocket;
 a small wheel, having a metal hub and a frictional surface, said hub being rotatably disposed on the outer end of said shaft with the wheel surface engaging the sprocket;
 a fixed contact and a fixed stop supported from said shaft in circumferentially spaced positions thereon, adjacent said metal hub, said contact being insulated from said shaft;
 a metallic finger secured to said hub in a slidingly rotatable relationship relative thereto, said finger being adapted to engage either said contact or said stop, depending upon the direction of rotation of said wheel; and
 and means for completing an electrical circuit through said shaft, said finger, and said contact, when said finger engages said contact.

2. A switch as claimed in claim 1 wherein said hub includes an outer cylinder that is spaced away from said shaft, a circumferential groove is formed on the inner surface of said outer cylinder, and which further includes a curved wire occupying said groove and extending more than 180° of the circumference of said cylinder, one end of said wire being turned radially inwardly to form said metallic finger.

3. A switch as claimed in claim 1 which further includes a metallic sleeve carried on said shaft intermediate said fixed contact and fixed stop and said metal hub, said metallic finger projecting laterally from said sleeve, said sleeve being rotatable on said shaft, and said metal hub frictionally engaging said sleeve for drivingly rotating same.

4. A switch as claimed in claim 1 which further includes a slide member, the outer end of said slide member being pivotally connected to the inner end of said shaft, and said slide member being cooperable with said bracket for establishing a selected position of adjustment of said wheel relative to said bracket.

5. A switch as claimed in claim 4 wherein said metal shaft is positioned in slightly nonparallel relationship to the bicycle frame member to which said bracket is fastened.

6. A switch as claimed in claim 1 which further includes an insulating member having a flat circular central body portion, a small sleeve formed integral with said central body portion and which tightly engages said shaft adjacent said bracket, and a large cylindrical flange extending outward from the other side of said central body portion; said flange being cut away through a portion of its circumference; said fixed contact being secured to one circumferential extremity of said flange, and the other circumferential extremity of said flange forming said fixed stop.

7. An electric switch for indicating the reversal of rotation of a wheel, comprising:
 a metal shaft;
 a wheel including a metallic hub rotatable on said shaft, said hub having an annular opening in one end thereof;
 an arcuately curved wire disposed within said annular opening in sliding engagement with a circumferential groove formed in one wall thereof through an angle of more than 180°, one end of said wire being turned across said opening to form a finger;
 a fixed contact and a fixed stop supported from said shaft and projecting into said annular opening, said stop being located within the arc of said wire and said contact being located outside the arc, whereby in one direction of rotation of said wheel said finger engages said contact and in the other direction of rotation said finger engages said stop;
 and means for completing an electrical circuit between said contact and said shaft when said finger engages said contact.